United States Patent [19]
Ciardi et al.

[11] Patent Number: 5,523,792
[45] Date of Patent: Jun. 4, 1996

[54] COMPOSITE VIDEO SUB-PIXEL TIMING ADJUSTMENTS USING DIGITAL RESAMPLING

[75] Inventors: John J. Ciardi, Portland; Keith R. Slavin, Aloha, both of Oreg.

[73] Assignee: Tektronix, Inc., Wilsonville, Oreg.

[21] Appl. No.: 359,153

[22] Filed: Dec. 19, 1994

[51] Int. Cl.$^6$ .............................. H04N 9/455; H03L 7/00
[52] U.S. Cl. .......................... 348/505; 348/517; 348/538
[58] Field of Search ................................ 348/505, 512, 348/516, 517, 518, 519, 520, 536, 537, 538, 539; H04N 9/455

[56] References Cited

U.S. PATENT DOCUMENTS 5,268,750  12/1993  Stec ................................... 348/505

Primary Examiner—Victor R. Kostak
Assistant Examiner—John W. Miller
Attorney, Agent, or Firm—Francis I. Gray

[57] ABSTRACT

Composite video timing adjustments using digital resampling provides precise sub-pixel timing relative to a timing reference with a single video master clock. A digital resampler interpolates an input digital composite video signal as a function of a phase offset input which defines a fractional clock period of the video master clock derived from the timing reference. The sub-pixel offset digital composite video signal also may be adjusted by integer multiples of the video master clock period using a FIFO memory. The final timing adjusted digital composite video signal then is input to an analog reconstruction circuit to provide an output analog composite video signal that is precisely timed to the timing reference.

5 Claims, 1 Drawing Sheet

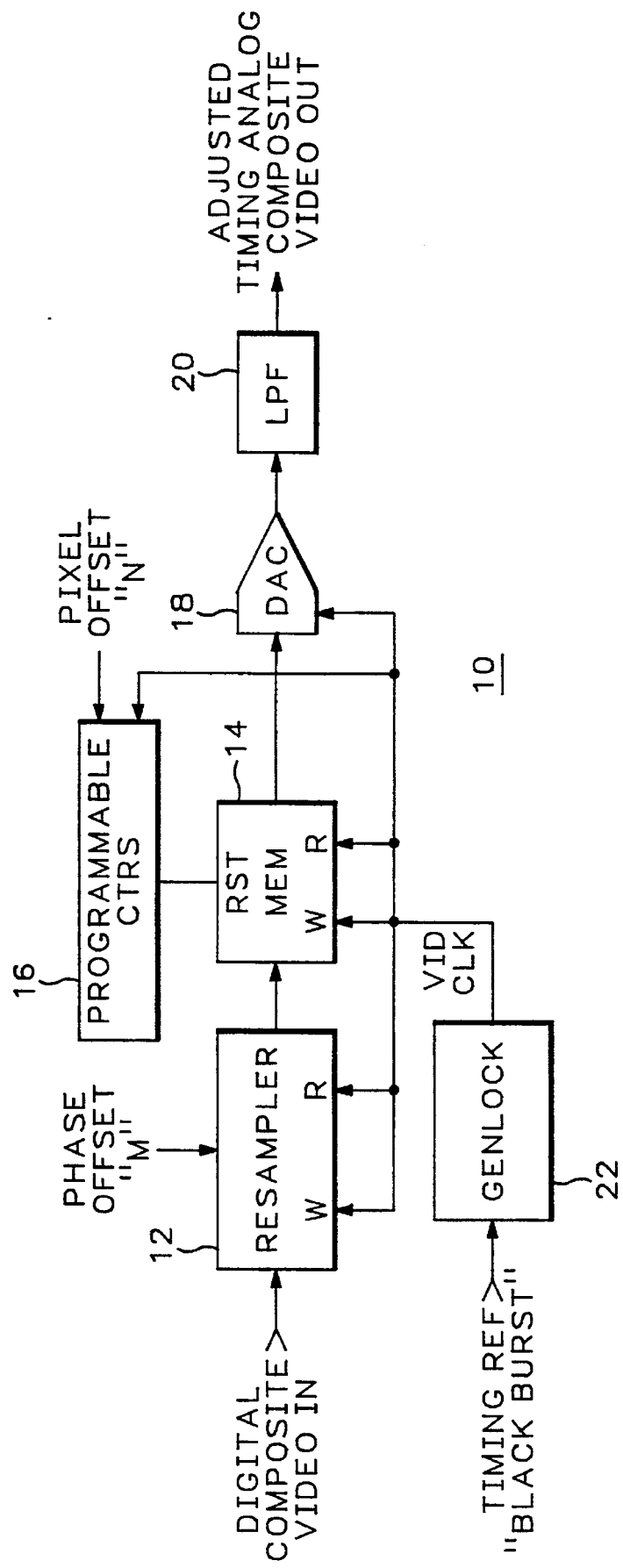

COMPOSITE VIDEO SUB-PIXEL TIMING ADJUSTMENTS USING DIGITAL RESAMPLING

BACKGROUND OF THE INVENTION

The present invention relates to timing adjustments, and more particularly to composite video timing adjustments using digital resampling.

Sub-pixel timing adjustment capability is a common requirement in video processing equipment which is synchronized, or genlocked, to a video plant timing reference, such as "black burst." Offsets, generated either by analog or digital delay lines, are typically used to compensate for varying cable lengths which distribute the video signal throughout the video plant. The routing distances, and therefore the time delay of the video signal, vary throughout the video plant, but must be time aligned when recombined. Sub-pixel timing adjustment satisfies this timing requirement. Integral pixel timing adjustments typically are used to compensate for delay introduced by digital video processing equipment, which introduce delays in multiples of a digital video clock period, present in other video plant channels.

The current state of the art for sub-pixel digital video waveform timing offsets is to use a number of "D" flip-flop registers to pipeline the digital video signal, where a series of cascaded clocks feed these registers. The cascaded clocks are buffered by some type of voltage or current controllable analog delay element. The controlling voltage or current originates from a digital to analog converter (DAC), allowing the delay to be digitally controlled. Numerous methods for implementing the delay are commercially available including those that use a triggered ramp/comparator type of vernier such as the Analog Devices AD9500, that use variable delay logic gates such as the Brooktree Bt622, and that use voltage variable capacitors (varactors) as the programmable delay element such as variable group delay, buffered, LC filter chains. Because of intrinsic propagation delays and setup/hold requirements in the registers and clock verniers, all of these methods require a minimum of two stages, and typically three stages, to implement sub-pixel delay which overlaps a full clock period. Because of the overlapping, monotonicity in crossing clock period boundaries and continuity in interacting with the integer pixel timing offset block requires at a minimum extensive calibration, and may be impossible to achieve. In addition these clock buffers, because of their analog nature, add jitter to the clock. This jitter increases in intensity with each additional pipeline stage. Clock jitter ultimately causes added distortion and noise in the digital to analog conversion process.

What is desired is a composite video timing adjustment method which is more precise than these prior methods and uses only a single, non-delayed master clock.

SUMMARY OF THE INVENTION

Accordingly the present invention provides a composite video timing adjustment method that uses digital resampling, which in combination with FIFO delay elements produces a continuum of timing offsets from a very small fraction of a clock period to many clock periods while operating on the video signal in a digital form. A master video clock is derived from a timing reference and is used for all timing and read/write operations. An input digital composite video signal is input to a resampler together with a phase offset input which defines a sub-pixel delay. The resampler interpolates the input digital composite video signal as a function of the phase offset input to provide a sub-pixel adjusted digital composite video signal. Integer pixel delay is provided for the sub-pixel adjusted digital composite video signal according to a pixel offset input using a FIFO memory. The final time adjusted digital composite video signal is input to an analog reconstruction circuit to provide an output analog composite video signal precisely timed with the timing reference.

The objects, advantages and other novel features of the present invention are apparent from the following detailed description when read in conjunction with the appended claims and attached drawing.

BRIEF DESCRIPTION OF THE DRAWING

The FIGURE is a block diagram view of a composite video timing adjustment system using digital resampling according to the present invention.

DESCRIPTION OF THE PREFERRED EMBODIMENT

Referring now to the FIGURE an all digital system architecture 10 for adjusting the timing of a composite digital video signal relative to a video timing reference is shown which has major precision improvements over current state of the art techniques described above and which uses only a single, non-delayed master clock. This architecture 10 provides a continuum of timing offsets from a very small fraction of a clock period to many clock periods while operating on the video signal in sampled and digitally quantized form, i.e., digital. The architecture 10 has a fractional clock period, or sub-pixel, timing offset processing block in the form of a digital resampler 12, an integral clock period, or pixel, timing offset processing block in the form of a FIFO memory 14 and programmable counters 16, a digital to analog converter (DAC) 18, an analog reconstruction filter in the form of an analog lowpass filter 20, and a video genlock circuit 22. A timing reference signal, such as video plant "black burst", is input to the video genlock circuit 22 to produce a video master clock signal. The video master clock signal is applied to the resampler 12 and the memory 14 as read and write signals, and to the counters 16 and DAC 18 to provide appropriate clocking.

Sub-pixel timing offsets are accomplished using the resampler 12, which is a sample rate converter that makes waveform time delay via sampled data digital interpolation a practical alternative to current analog clock delay techniques. The resampler 12 accepts as inputs a digital composite video data stream at a data rate Tclk and a digital phase offset word, m, which specifies the fractional clock period delay $m/2^{}16$, $0<=m<=(2^{}16)-1$, and outputs a digitally interpolated data stream, also at data rate Tclk. This digitally interpolated video data stream is equivalent to the original analog video waveform sampled and quantized at intervals of $k+(m/2^{**}16))^*Tclk$ instead of $k^*Tclk$. Sub-pixel timing advance along with delay may be implemented if $m=2^{}15$ is defined as "zero" timing offset. Timing advance corresponds to values of $m<2^{}15$ while timing delay corresponds to values of $m>2^{**}15$. The resampler 12 uses an appropriate interpolation algorithm, which may be implemented in hardware. The resampler 12 is capable of decimating or interpolating sample rates between the input and output data streams over a wide range. However for this timing adjustment application the input (write) and output (read) clocks are tied together, resulting in no sample rate change, only phase (sub-pixel) change. Digital interpolators using a "polyphase" architecture may also be used if there are a large enough number of phase offsets to provide the smallest amount of offset desired.

Integer pixel delays are implemented on the phase delayed video signal from the resampler 12 using the FIFO memory 14. The amount of specifiable pixel delay, n, depends upon the memory depth and is determined by application requirements. The memory write and read clocks are the video master clock, and the waveform delay through the memory 14 is equal to the period of the reset pulse generated by the programmable counters 16, as is well known in the art. The resulting timing adjusted video signal from the memory 14 is input to the DAC 18 and filter 20 to reconstruct the original analog video signal, now timed precisely to the video plant timing reference.

The precision of the resampler 12 allows a continuum of phase offsets crossing the sub-pixel offset to pixel offset boundary. This continuum is difficult to achieve using standard analog clock delay techniques described above. For example if n=3 and as m increases from 0 to 65535, i.e., (2**16)−1, the clock boundary is simply crossed by simultaneously setting n=4 and m=0. This boundary crossing is monotonic and repeatable by design. Monotonicity and repeatability is achieved by standard analog clock delay techniques only via extensive calibration, if at all. Although the FIGURE shows sub-pixel delay processing preceding integral pixel delay processing, these processing blocks may be reversed.

Thus the present invention provides composite video timing adjustments using digital resampling and a single video master clock, the digital resampling interpolating the composite video according to a desired phase offset to provide a precise sub-pixel timing adjustment.

What is claimed is:

1. An architecture for composite video timing adjustments comprising:

means for generating a video master clock from a timing reference signal; and means for resampling an input digital composite video signal by interpolating between pulses of the video master clock, the interpolating being a function of a phase offset input, to produce a timing adjusted digital composite video signal.

2. The architecture as recited in claim I further comprising means for delaying the timing adjusted digital composite video signal by an integer multiple of video master clock intervals determined by a pixel offset input to produce a final timing adjusted digital composite video signal.

3. The architecture as recited in claim 2 further comprising means for reconstructing an output analog composite video signal from the final timing adjusted digital composite video signal.

4. An architecture for composite video timing adjustments comprising:

means for generating a video master clock signal from a timing reference signal;

means for delaying an input digital composite video signal by an integer multiple of video master clock intervals determined by a pixel offset input to produce a timing adjusted digital composite video signal; and means for resampling the timing adjusted digital composite video signal by interpolating between pulses of the video master clock, the interpolating being a function of a phase offset input, to produce a final timing adjusted digital composite video signal.

5. The architecture as recited in claim 4 further comprising means for reconstructing an output analog composite video signal from the final timing adjusted digital composite video signal.

* * * * *